Patented Sept. 11, 1945

2,384,755

UNITED STATES PATENT OFFICE 2,384,755

MONOAZO DYESTUFFS

Arthur Howard Knight, Blackley, Manchester, England, assignor to Imperial Chemical Industries Limited, a corporation of Great Britain No Drawing. Application February 11, 1943, Serial No. 475,537. In Great Britain February 11, 1942

4 Claims. (Cl. 260—199)

The present invention relates to the manufacture of new monoazo acid dyestuffs suitable for the colouring of animal fibres.

According to the invention monoazo dyestuffs are made by diazotising an amine of the general formula X—CO—NY—R—NH$_2$ in which R stands for a m- or p-phenylene residue which may carry simple azo dyestuff substituents, for example, methyl, methoxy, or sulphonic acid groups, but is devoid of hydroxyl or carboxyl groups in ortho position to the primary amino group, X stands for a mono- chloro- or monobromo-alkyl radical (C$_1$—C$_3$), and Y stands for hydrogen, alkyl (C$_1$ to C$_6$), cycloalkyl, aralkyl, alkoxyalkyl, or aryl, and coupling the diazo compound so-obtained with a 2- or 3-amino-8-naphthol-6-sulphonic acid in which one amino hydrogen is substituted by a mono-halogenoalkyl (C$_1$—C$_3$)—CO grouping and the other, if desired, by an alkyl or hydroxyalkyl radical.

Also according to the invention the new dyestuffs are employed for colouring animal fibres, e. g., wool and silk.

The new dyestuffs dye wool from an acid bath in various shades of orange and red, the dyeings being characterised by very good fastness to severe washing, milling and perspiration and good fastness to light.

The following are examples of diazo components which may be employed in accordance with the present invention:

4-amino-1-N-ethyl-omega-chloroacetanilide,
4-amino-1-N-isopropyl-omega-chloroacetanilide,
4-amino-1-N-n-butyl-omega-chloroacetanilide,
4-amino-2-N-ethyl-omega-chloroacet-toluidide,
4-amino-2-N-ethyl-omega-bromopropion-toluidide,
4-amino-2-N-ethyl-α-bromobutyryl-toluidine,
3-amino-omega-chloroacetanilide-4-sulphonic acid,
2-amino-4-N-ethyl-omega-chloroacet-toluidide,
4-amino-2-N-ethyl-α-bromopropiontoluidide,
4-amino-2-N-ethyl-omega-chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino-omega-chloroacetanilide-3-sulphonic acid,
4-amino-2-N-ethyl-omega-chloroacetanisidide,
4-amino-1-N-n-butyl-omega-chloroacetanilide-2-sulphonic acid,
4-amino-1-N-ethyl-omega-bromoacetanilide,
4-amino-1-N-benzyl-omega-chloroacetanilide,
4-amino-1-N-cyclohexyl-omega-chloroacetanilide,
5-amino-2-N-cyclohexyl-omega-chloroacet-toluidide,
3-amino-1-N-benzyl-omega-chloroacetanilide,
4-amino-2-N-benzyl-omega-chloroacet-toluidide,
4-amino-1-N-phenyl-omega-chloroacetanilide,
4-amino-1-N-cyclohexyl-omega-chloropropionanilide,
4-amino-1-N-cyclohexyl-omega-bromopropionanilide,
4-amino-1-N-cyclohexyl-α-bromopropionanilide,
4-amino-1-N-cyclohexyl-omega-bromoacetanilide, and
4-amino-2-N-benzyl-omega-chloroacetanisidide (obtainable by methods described in British Patent No. 544,409 or our U. S. Patent No. 2,346,492) and 4-amino-1-N-β-ethoxyethyl-omega-chloroacetanilide (obtainable by acetylating N-β-ethoxyethylaniline, nitrating, removing the acetyl group by hydrolysis, causing the resulting 4-nitro-1-N-β-ethoxyethylaniline to react with chloroacetyl chloride in boiling toluene and reducing the 4-nitro-1-N-β-ethoxy-ethyl-omega-chloroacetanilide thus obtained).

As examples of coupling components which may be employed according to the present invention, I mention:

2-omega-chloro-acetylamino-8-naphthol-6-sulphonic acid,
2-omega-bromo-acetylamino-8-naphthol-6-sulphonic acid,
2-omega-iodo-acetylamino-8-naphthol-6-sulphonic acid,
3-omega-chloro-acetylamino-8-naphthol-6-sulphonic acid,
3-omega-bromo-acetylamino-8-naphthol-6-sulphonic acid,
2-omega-chloro-propionylamino-8-naphthol-6-sulphonic acid,
2-omega-bromo-propionylamino-8-naphthol-6-sulphonic acid,
3-omega-chloro-propionylamino-8-naphthol-6-sulphonic acid,
3-omega-bromo-propionylamino-8-naphthol-6-sulphonic acid,
3-N-omega-chloro-acetyl-N-ethylamino-8-naphthol-6-sulphonic acid,
2-N-omega-chloro-acetyl-N-methylamino-8-naphthol-6-sulphonic acid, and
2-N-α-bromo-propionyl-N-β-hydroxyethylamino-8-naphthol-6-sulphonic acid, The above coupling components may be prepared by interaction between the required sodium (2 or 3)-amino-(or N-monoalkylamino- or N-monohydroxyalkylamino-)- 8 - naphthol-6-sulphonate and the appropriate monohalogenoacyl chloride at 10-20° C. in aqueous medium maintained slightly alkaline by means of sodium carbonate.

British Patent No. 216,971 relates to the manufacture of azo-dyes by coupling a diazo compound of a benzene derivative which contains an alkyl-acidylamino group, e. g., 4-ethyl-acetylamino-2-toluidine with an azo-dyestuff component, e. g., 2 - phenylamino- 8 -naphthol- 6 -sulphonic acid, but neither describes any red or orange dyestuff nor mentions any of the present dyestuffs, nor their components. The present dyestuffs are distinguished by giving orange and red shades of outstanding fastness to milling and washing.

British Patent No. 340,640 relates to the manufacture of azo dyestuffs for wool by coupling a diazotised N-acyl-cyclohexylaminoarylamine or substitution product thereof, e. g., 1-(N-acetyl-cyclohexyl-amino)-4-aminobenzene, with an azo component containing a sulphonic and/or carboxylic acid group, e. g., 1-(benzoyl-amino)-8-naphthol-4:6-disulphonic acid, but discloses no halogenoacyl groups which are characteristic of the present diazo and coupling components. The present dyestuffs surpass those of (Br.) 340,640 having similar shades, in respect of fastness to servere washing and milling.

British Patent No. 341,461 relates to making acid wool azo dyestuffs by coupling a diazo compound of an aromatic amine, e. g., 4-ethyl-acetyl-amino-2-aminotoluene, with an omega-halogeno-acyl-amino-naphthol-sulphonic acid or a derivative thereof, e. g., 2- or 3-omega-chloroacetyl-amino-8-naphthol-6-sulphonic acid, but describes no diazo component of the present invention. Moreover the present dyestuffs surpass the nearest dyestuffs of (Br.) 341,461 in fastness to perspiration.

British Patent No. 432,020 describes the manufacture of azo-dyestuffs by coupling diazotised orthanilic acid which may carry a monovalent substituent excluding halogen in the o-position to the amino group, and may contain further substituents other than the hydroxy group, e. g., 1-acetylamino-3-aminobenzene-4-sulphonic acid, with a 1-, 2-, 3- or 4-acylamino-, -acylaryl- or -acylalkyl-amino-8-naphthol-6-sulphonic acid, e. g., 4-acetylamino-8-naphthol-6-sulphonic acid, but does not mention the halogeno-alkyl-CO-group which characterises the present diazo and coupling components.

British Patent No. 472,171 describes making azo-dyestuffs containing at least one solubilising group by coupling diazotised N-acyl-N-alkyl-phenylenediamines in which the alkyl group is isopropyl, β-methyl or ββ'-dimethylisopropyl and the phenylene residue may contain further substituents, e. g., 1-(N-acetylisopropylamino)-4-aminobenzene, with a coupling component, e. g., 2-, 3- and 4-chloro-acetylamino-8-naphthol-6-sulphonic acid but describes no diazo component of the present invention. Furthermore, the present dyestuffs surpass those of similar shade described in British Patent No. 472,171 in respect of fastness to severe washing and milling.

The invention is illustrated but not limited by the following examples in which the parts are by weight.

*Example 1*

21.25 parts of 4-amino-1-N-ethyl-omega-chloro-acetanilide are dissolved in a mixture of 300 parts of water and 25 parts of 36% hydrochloric acid. 6.9 parts of sodium nitrite in 50 parts of water are added. The resulting diazo solution is cooled to 5°-10° C. and added gradually to a cooled and stirred mixture of 33.75 parts of sodium 3-omega-chloroacetylamino-8-naphthol-6-sulphonate (2-omega-chloroacetyl-amino-5-naphthol-7-sulphonate), 600 parts of water and 21 parts of anhydrous sodium carbonate. Coupling is rapid and, when complete, the resulting dyestuff is filtered off, washed and dried.

The new dyestuff is red in colour, dissolving in water with a yellowish-red colour and in concentrated sulphuric acid with a crimson-red colour. It dyes wool from a dyebath containing sulphuric acid and Glauber's salt in reddish orange shades, having very good fastness to severe washing, milling and perspiration, and good fastness to light.

If the sodium carbonate used above is replaced by 27 parts of sodium acetate crystals a dyestuff is obtained which dyes wool from an acid bath in somewhat yellower shades of orange, the dyeings having similar fastness properties.

*Example 2*

21.25 parts of 4-amino-1-N-ethyl-omega-chloro-acetanilide are diazotised as in Example 1. The solution of the diazo compound is added to a stirred and cooled solution of 33.75 parts of sodium 2-omega-chloroacetylamino-8-naphthol-6-sulphonate in 600 parts of water to which have been added 27 parts of sodium acetate crystals. Stirring is continued until coupling is complete when the dyestuff so-obtained is filtered off, washed and dried.

The new dyestuff dyes wool from a dyebath containing sulphuric acid and Glauber's salt in bluish scarlet shades, having very good fastness to severe washing, milling and perspiration and good fastness to light.

A dyestuff having similar properties is obtained if the 27 parts of sodium acetate crystals used above are replaced by 21 parts of anhydrous sodium carbonate.

*Example 3*

22.65 parts of 4-amino-2-N-ethyl-omega-chloroacet-toluidide are dissolved in a mixture of 400 parts of water and 25 parts of 36% hydrochloric acid and diazotised at 5°-10° C. by the addition of 6.9 parts of sodium nitrite. The solution of the diazo compound so-obtained is added gradually to a cooled and stirred solution of 33.75 parts of sodium 2-omega-chloroacetyl-amino-5-naphthol-7-sulphonate in 600 parts of water to which have been added 27 parts of sodium acetate crystals. The new dyestuff is filtered off, washed and dried.

The new dyestuff is yellowish red in colour, soluble in water with a reddish orange colour and in concentrated sulphuric acid with a bluish red colour. It dyes wool from a dyebath containing sulphuric acid and Glauber's salt in bright reddish orange shades, the dyeings having very good fastness to severe washing, milling and perspiration, and good fastness to light.

*Example 4*

In Example 3, the 33.75 parts of sodium 2-omega - chloro - acetylamino -5- naphthol-7-sulphonate are replaced by 35.15 parts of sodium 2-omega - chloropropionylamino-5-naphthol-7-sulphonate. A dyestuff having similar properties to those of the dyestuff of Example 3 is obtained.

Example 5

22.65 parts of 4-amino-2-N-ethyl-omega-chloroacet-toluidide are diazotised as in Example 3. The diazo solution is then added to a stirred and cooled solution of 33.75 parts of sodium 2-omega-chloroacetylamino-8-naphthol-6-sulphonate in 600 parts of water containing 27 parts of sodium acetate crystals. Stirring is continued until coupling is complete, when the resulting dyestuff is filtered off, washed and dried.

The new dyestuff is reddish brown in colour, dissolving in water and also in concentrated sulphuric acid with a red colour. It dyes wool from a dyebath containing sulphuric acid and Glauber's salt in bluish scarlet shades, having very good fastness to severe washing, milling and perspiration, and good fastness to light.

Example 6

In Example 5, the 22.65 parts of 4-amino-2-N-ethyl-omega-chloroacet-toluidide are replaced by 28.5 parts of 4-amino-2-N-ethyl-omega-bromo-propiontoluidide.

A dyestuff is obtained having similar properties to those of the dyestuff of Example 5.

Example 7

28.85 parts of 4-amino-2-N-benzyl-omega-chloroacet-toluidide (M. P. 97°–98° C.) are dissolved in a mixture of 400 parts of water and 25 parts of 36% hydrochloric acid and diazotised at 5°–10° C. by the addition of 6.9 parts of sodium nitrite. The solution of the diazo compound so-obtained, after filtration if necessary, is added to a stirred and cooled solution of 33.75 parts of sodium 2-omega-chloroacetylamino-5-naphthol-7-sulphonate in 600 parts of water containing 27 parts of sodium acetate crystals. Stirring is continued until coupling is complete when the dyestuff so-obtained is filtered off, washed with 5% sodium chloride solution, and dried.

It dyes wool from a dyebath containing sulphuric acid and Glauber's salt in bright reddish orange shades, having very good fastness to severe washing, milling and perspiration, and good fastness to light.

Example 8

28.85 parts of 4-amino-2-N-benzyl-omega-chloroacet-toluidide are diazotised as in Example 7. The solution of the diazo compound is then added to a stirred and cooled solution of 33.75 parts of sodium 2-omega-chloroacetylamino-8-naphthol-6-sulphonate in 650 parts of water containing 21 parts of anhydrous sodium carbonate. The dyestuff so-obtained is filtered off, washed and dried.

The new dyestuff dyes wool from an acid bath in bluish scarlet shades of very good fastness to severe washing, milling and perspiration, and good fastness to light.

If the 21 parts of anhydrous sodium carbonate used above are replaced by 27 parts of sodium acetate crystals, a dyestuff is obtained which yields on wool slightly yellower shades, of similar fastness properties.

A dyestuff having similar properties is also obtained if the 33.75 parts of sodium 2-omega-chloro-acetylamino-8-naphthol-6-sulphonate employed above are replaced by 38.2 parts of sodium 2-omega-bromoacetylamino-8-naphthol-6-sulphonate.

Example 9

22.65 parts of 4-amino-1-N-isopropyl-omega-chloroacetanilide are dissolved in 300 parts of water and 25 parts of 36% hydrochloric acid. 6.9 parts of sodium nitrite are added. The resulting diazo solution is stirred at 5°–10° C. into a similarly cooled solution of 33.75 parts of sodium 2-omega-chloroacetylamino-5-naphthol-7-sulphonate in 600 parts of water containing 27 parts of sodium acetate crystals. When coupling is complete the dyestuff is filtered off, washed with 5% aqueous sodium chloride and dried.

The new dyestuff dyes wool from an acid bath in reddish orange shades of very good fastness to severe washing, milling and perspiration and good fastness to light.

Example 10

26.65 parts of 4-amino-1-N-cyclohexyl-omega-chloroacetanilide are dissolved in 250 parts of hot water and 35 parts of 36% hydrochloric acid. To the resulting solution, cooled to 15°–30° C., are added 7 parts of sodium nitrite. The solution of the diazo compound, after filtration if necessary, is cooled to 10°–15° C. and added to a solution at 5°–10° C. of 35.15 parts of sodium 2-omega-chloropropionylamino-5-naphthol-7-sulphonate in 800 parts of water to which 40 parts of sodium acetate crystals have been added. Coupling is rapid and, when complete, the dyestuff is filtered off, washed with 5% sodium chloride solution and dried.

The new dyestuff dyes wool from a dyebath containing sulphuric acid and Glauber's salt in reddish orange shades, the dyeings having very good fastness to severe washing, milling, and perspiration and good fastness to light.

The invention is further illustrated by the examples listed in the following table:

| Example | Diazo component | Coupling component | Coupled in the presence of— | Shade given by dyestuff on wool |
|---|---|---|---|---|
| 11 | 2-amino-4-N-ethyl-omega-chloroacet-toluidide. | 2-omega-chloroacetylamino-5-naphthol-7-sulphonic acid. | Sodium acetate | Reddish orange. |
| 12 | 4-amino-1-N-ethyl-omega-chloropropionanilide. | 2-omega-chloro-propionylamino-8-naphthol-6-sulphonic acid. | do | Red. |
| 13 | 4-amino-1-N-ethyl-omega-chloroacetanilide. | 2-N-omega-chloroacetyl-N-methylamino-8-naphthol-6-sulphonic acid. | do | Red brown. |
| 14 | 2-amino-4-N-ethyl-omega-chloro-acetotoluidide. | 2-omega-chloroacetylamino-8-naphthol-6-sulphonic acid. | do | Dull red. |
| 15 | 4-amino-1-N-cyclohexyl-omega-chloropropionanilide. | 2-omega-chloropropionylamino-5-naphthol-7-sulphonic acid. | do | Reddish orange. |
| 16 | do | 2-omega-chloroacetylamino-5-naphthol-7-sulphonic acid. | do | Do. |
| 17 | 3-amino-omega-chloroacetanilide-4-sulphonic acid. | do | do | Dull orange. |
| 18 | 4-amino-1-N-β-ethoxyethyl-omega-chloroacetanilide. | 2-omega-bromoacetyl-amino-5-naphthol-7-sulphonic acid. | do | Reddish orange. |
| 19 | 4-amino-1-N-n-butyl-omega-chloroacetanilide. | 2-N-α-bromopropionyl-N-β-hydroxyethylamino-8-naphthol-6-sulphonic acid. | do | Red brown. |

I claim:
1. An azo dyestuff represented by the formula

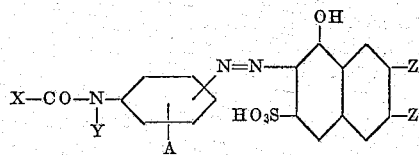

wherein the diazo component is devoid of hydroxyl and carboxyl groups in ortho position to the primary amino group; X represents a monohalogeno-alkyl radical having 1 to 4 carbons; Y represents one of the group consisting of hydrogen, alkyl having 1 to 4 carbons, lower alkoxyalkyl, phenyl, benzyl and cyclohexyl; A represents one of the group consisting of hydrogen, alkyl, alkoxy and sulfonic acid; one Z is hydrogen and the other is an omega halogen acylamino radical of the group consisting of omega halogen acetylamino and omega halogen propionylamino wherein the amino nitrogen is substituted by one of a group consisting of hydrogen, alkyl and hydroxyethyl.

2. The dyestuff represented by the formula

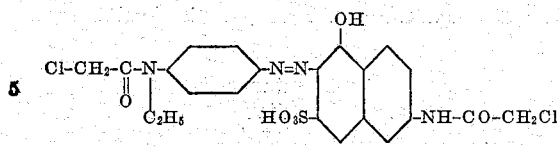

3. The dyestuff represented by the formula

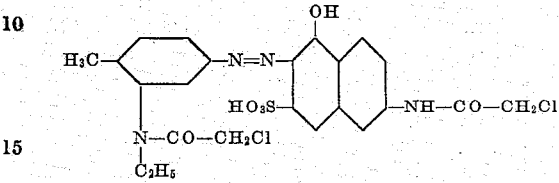

4. The dyestuff represented by the formula

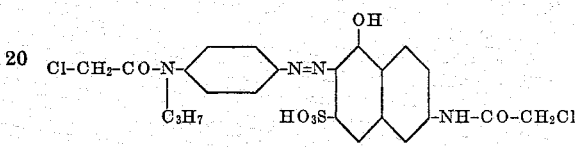

ARTHUR HOWARD KNIGHT.